United States Patent
Ding et al.

(10) Patent No.: US 12,258,989 B2
(45) Date of Patent: Mar. 25, 2025

(54) CONNECTION LOCK FOR PREFABRICATED COMPONENTS

(71) Applicant: Guangzhou Metro Design & Research Institute Co., Ltd., Guangdong (CN)

(72) Inventors: Xianli Ding, Guangdong (CN); Zihui Zan, Guangdong (CN); Xingzhong Nong, Guangdong (CN); Juyang Wu, Guangdong (CN); Haiou Shi, Guangdong (CN); Bao Xiang, Guangdong (CN); Ran Wang, Guangdong (CN); Feiqi Ou, Guangdong (CN); Qian Zhou, Guangdong (CN); Hengyi Li, Guangdong (CN); Chunjie Liu, Guangdong (CN); Shengya He, Guangdong (CN); Liang Ye, Guangdong (CN)

(73) Assignee: Guangzhou Metro Design & Research Institute Co., Ltd., Guangzhou (CN)

( * ) Notice: Subject to any disclaimer, the term of this patent is extended or adjusted under 35 U.S.C. 154(b) by 672 days.

(21) Appl. No.: 17/577,408

(22) Filed: Jan. 18, 2022

(65) Prior Publication Data
US 2022/0154449 A1 May 19, 2022

Related U.S. Application Data

(63) Continuation of application No. PCT/CN2020/138751, filed on Dec. 23, 2020.

(30) Foreign Application Priority Data

Nov. 13, 2020 (CN) .......................... 202011276100.9

(51) Int. Cl.
*F16B 2/06* (2006.01)
*E04B 1/38* (2006.01)

(52) U.S. Cl.
CPC .............. *F16B 2/065* (2013.01); *E04B 1/388* (2023.08); *F16B 2200/20* (2018.08); *Y10T 403/32057* (2015.01); *Y10T 403/32196* (2015.01)

(58) Field of Classification Search
CPC .. E04B 1/388; F16B 2/06; F16B 2/065; F16B 2/10; F16B 2/12; F16B 5/06–0692;
(Continued)

(56) References Cited

U.S. PATENT DOCUMENTS 5,034,870 A * 7/1991 Weber .................. B60Q 1/0683
74/606 R
8,074,792 B2 * 12/2011 Webb .................. B65G 19/287
403/53
(Continued)

FOREIGN PATENT DOCUMENTS

| CN | 206279630 U | 6/2017 |
| CN | 208578168 U | 3/2019 |
| CN | 111188418 A | 5/2020 |

*Primary Examiner* — Josh Skroupa
*Assistant Examiner* — Kevin J Baynes

(57) ABSTRACT

A connection lock for prefabricated components includes an auxiliary part and a main part which are each provided with a fixing structure for connecting with a prefabricated component in an anchoring fit manner. The auxiliary part includes an auxiliary part body, an auxiliary part transmission structure, and a lock pin structure which is movably mounted to the auxiliary part body. The auxiliary part transmission structure is in transmission fit with the lock pin structure. The main part includes a main part body, a main part transmission structure, and a locking structure. An inserting channel fitted with the lock pin structure is formed in the main part body. The locking structure is adjustably mounted in the main part body. The main part transmission structure is in transmission fit with the locking structure. It
(Continued)

is rapid and convenient to operate, and the construction efficiency is higher than traditional construction methods.

9 Claims, 3 Drawing Sheets

(58) Field of Classification Search
CPC .......... F16B 7/04–0493; F16B 2200/20; F16B 2200/40; Y10T 403/32008; Y10T 403/32024; Y10T 403/32032; Y10T 403/32041; Y10T 403/32057; Y10T 403/32114; Y10T 403/32131; Y10T 403/32147; Y10T 403/32155; Y10T 403/32163; Y10T 403/32181; Y10T 403/32196; Y10T 403/32204; Y10T 403/32213; Y10T 403/32254; Y10T 403/32271

See application file for complete search history.

(56) References Cited

U.S. PATENT DOCUMENTS

| | | | |
|---|---|---|---|
| 8,459,602 B2 * | 6/2013 | Herskovic | F16M 11/2035 |
| | | | 248/229.15 |
| 9,903,532 B2 * | 2/2018 | Kovacs | F16B 43/025 |
| 10,531,733 B1 * | 1/2020 | Ho | F16M 13/022 |
| 10,816,031 B2 * | 10/2020 | Blaess | F16B 25/0031 |
| 11,085,478 B2 * | 8/2021 | Trego | B25H 1/02 |
| 11,412,852 B2 * | 8/2022 | Hong | A47B 96/1475 |

* cited by examiner

CONNECTION LOCK FOR PREFABRICATED COMPONENTS

CROSS REFERENCE TO RELATED APPLICATIONS

The present application is a Continuation Application of PCT Application No. PCT/CN2020/138751 filed on Dec. 23, 2020, which claims the benefit of Chinese Patent Application No. 202011276100.9 filed on Nov. 13, 2020. All the above are hereby incorporated by reference in their entirety.

TECHNICAL FIELD

The present invention relates to the field of component connection, in particular to a connection lock for prefabricated components.

BACKGROUND

Prefabricated construction is an economical, fast, and environment-friendly construction method. Usually, components are prefabricated in a factory and then assembled on the construction site to complete the construction. Whether the components are reliably connected is closely related to the building quality.

For example, the Chinese utility model patent with the patent No. CN208578168U filed on Mar. 5, 2019 discloses a connecting structure for prefabricated components, and specifically discloses that a first rigid rod and a second rigid rod are respectively pre-installed in two prefabricated components. The connecting structure further includes: a screw joint, one end of which being screwed to an end of the second rigid rod, and an accommodating cavity being formed on the other end of the screw joint facing the first rigid rod; an elastic collet being in threaded connection with the screw joint and having an elastic clamping member extending into the accommodating cavity; an insertion rod which has a screw end and a reducing insertion joint being respectively arranged on both sides of the screw section; and a locking member screwed to the screw section, for fastening the elastic collet toward the insertion joint. The screw end is screwed to the first rigid rod, the insertion rod at least partially penetrates the elastic collet, and the insertion joint extends into the accommodating cavity and forms a clamping structure with the elastic clamping member.

In the connecting structure for prefabricated components in the prior field, the insertion rod and the first rigid rod, and the screw joint and the second rigid rod can move relative to each other to realize margin adjustment of the connecting structure. In actual assembly construction, the connection between the components must be seamless. However, when an existing connecting structure is used, an operation space needs to be reserved, which cannot meet assembly requirements for seamless connection of the components, and the operation steps of connecting the components are cumbersome and complex, and the construction efficiency is low.

SUMMARY

In order to solve the above problems, an objective of the present invention is to provide a connection lock for prefabricated components, to solve the problems that when an existing connecting structure is used, an operation space needs to be reserved between components, which cannot meet the assembly requirement for seamless connection of the components, and the operation steps of connecting the components are cumbersome and complex, and the construction efficiency is low.

A technical solution of a connection lock for prefabricated components of the present invention is as follows.

A connection lock for prefabricated components includes an auxiliary part and a main part which are each provided with a fixing structure for connecting with prefabricated components in an anchoring fit manner. The auxiliary part includes an auxiliary part body, an auxiliary part transmission structure and a lock pin structure. The lock pin structure is movably mounted to the auxiliary part body. The auxiliary part transmission structure is in transmission fit with the lock pin structure.

The main part includes a main part body, a main part transmission structure, and a locking structure. An inserting channel fitted with the lock pin structure is formed in the main part body. The locking structure is adjustably mounted in the main part body. The main part transmission structure is in transmission fit with the locking structure. The locking structure is locking fitted with the lock pin structure after the lock pin structure is inserted in place.

Further, the auxiliary part transmission structure may be an auxiliary part transmission shaft rotatably mounted in the auxiliary part body, an end of the auxiliary part transmission shaft may be provided with a screw operation member, and an axial direction of the auxiliary part transmission shaft may be perpendicular to a movement direction of the lock pin structure. The auxiliary part transmission shaft may be provided with a gear for stop or rotation of the auxiliary part transmission shaft, and the lock pin structure may include a rack section engaged with the gear.

Further, the lock pin structure may further include an insertion part ball-hingedly connected to the rack section, and the insertion part may be arranged at an end of the rack section away from the auxiliary part body.

Further, a ball head may be arranged on the end of the rack section away from the auxiliary part body, one end of the insertion part is provided with a ball groove matched with the ball head, and the other end of the insertion part is provided with chucks matched with the locking structure.

Further, the insertion part may include a first block and a second block which are fixedly connected, one end of the first block and one end of the second block are each provided with an arc notch, and the arc notch of the first block and the arc notch of the second block together form the ball groove.

Further, the main part transmission structure can be a main part transmission shaft rotatably mounted in the main part body, an end of the main part transmission shaft may be also provided with a screw operation member, and an axial direction of the main part transmission shaft may be perpendicular to a movement direction of the lock pin structure. The locking structure may be slidably mounted in the main part body, and the locking structure may be in screw-thread fit with the main part transmission shaft.

Further, guide rods parallel to the axial direction of the main part transmission shaft may be arranged in the main part body, and the guide rods may slide through the locking structure. The main part transmission shaft is provided with a threaded section, and the locking structure may be further provided with a threaded hole matched with the threaded section.

Further, the locking structure includes a plate-shaped sliding seat, stopping protrusions, and a nut. The plate-shaped sliding seat may be in sliding fit with the guide rods. The stopping protrusions may be arranged on an edge of the plate-shaped sliding seat. A through hole may be formed in a middle of the plate-shaped sliding seat. The nut may be fixed to the through hole of the plate-shaped sliding seat.

Further, chucks may be arranged on an end of the lock pin structure away from the auxiliary part body. A first locking inclined surface may be formed on an inner side of each chuck. A second locking inclined surface may be formed on an inner side of each stopping protrusion. The first locking inclined surface may be in sliding fit with the second locking inclined surface.

Further, the fixing structure includes a plurality of threaded sleeves for connecting with steel bars of the prefabricated components, and axes of the plurality of threaded sleeves may be parallel to a movement direction of the lock pin structure.

Beneficial effects: before assembly is carried out, the auxiliary part and the main part are pre-arranged in the respective prefabricated components. The fixing structures of the auxiliary part and the main part are connected with the prefabricated components in an anchoring fit manner, and two prefabricated components respectively provided with the auxiliary part and the main part are butted and assembled. The auxiliary part transmission structure drives the lock pin structure to move into the inserting channel of the main part, and after the lock pin structure is inserted in place, the main part transmission structure drives the locking structure to move, so that the locking structure and the lock pin structure entering into the main part are fitted in a locked manner, thereby achieving reliable connection between the auxiliary part and the main part and further between the two prefabricated components.

It should be noted that when the connection lock for prefabricated components is used for assemble, the lock pin structure is telescopically adjusted by the auxiliary part transmission structure, and the locking structure and the lock pin structure are locked through the main part transmission structure. The two operations are respectively performed on the auxiliary part (or its corresponding prefabricated component) and the main part (or its corresponding prefabricated component), so that an assembly operation between two components is avoided, and an operation space does not need to be reserved at a butt position, which meets the assembly requirement for seamless connection of prefabricated components. Moreover, the operation of connecting the prefabricated components is rapid and convenient, and the construction efficiency is relatively high.

Figure 1:
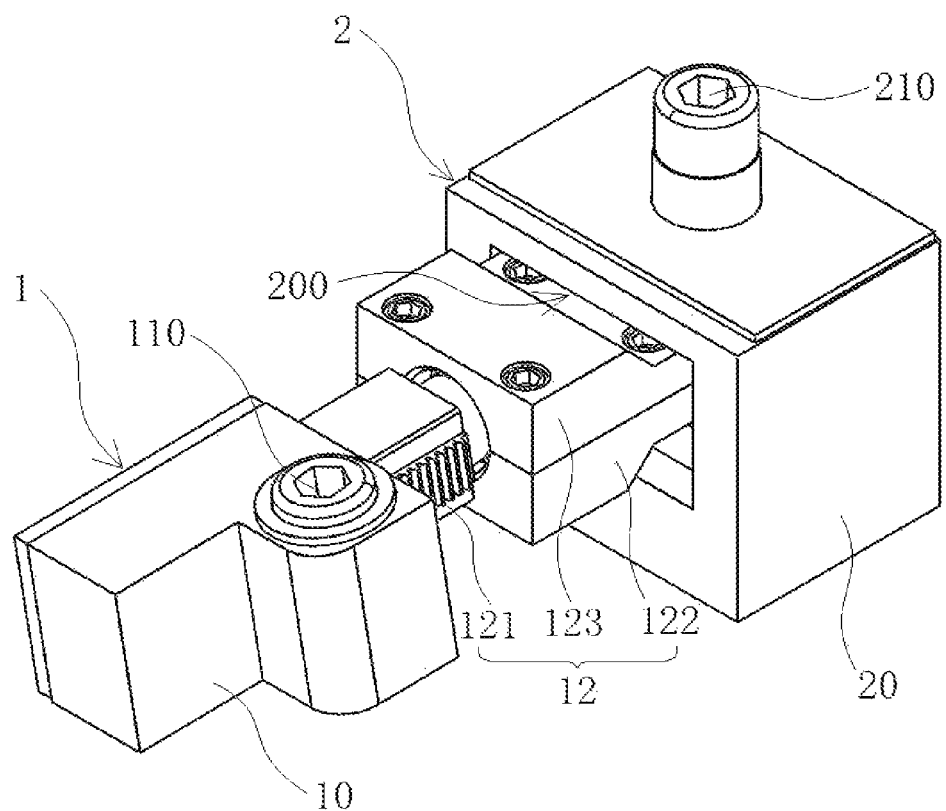
FIG. 1 is a schematic perspective view of a connection lock in a specific embodiment 1 of a connection lock for prefabricated components according to the present invention.

In the drawings: 1—auxiliary part, 10—auxiliary part body, 11—auxiliary part transmission shaft, 110—screw operation member of the auxiliary part transmission shaft, 111—gear, 12—lock pin structure, 120—ball head, 121—rack section, 122—first block, 123—second block, 124—chuck, 125—first locking inclined surface, 126—ball groove, 127—insertion part, 14—shell, 2—main part, 20—main part body, 200—inserting channel, 201—guide rod, 21—main part transmission shaft, 210—screw operation member of the main part transmission shaft, 211—threaded section, 22—locking structure, 220—plate-shaped sliding seat, 221—stopping protrusion, 222—nut, 223—second locking inclined surface, 224—threaded hole, 225—through hole, and 3—threaded sleeve.

DETAILED DESCRIPTION

The specific implementations of the present invention are described in more detail below with reference to the accompanying drawings and embodiments. The following embodiments are illustrative of the present invention and should not be construed as limiting of the scope of the present invention.

Figure 2:
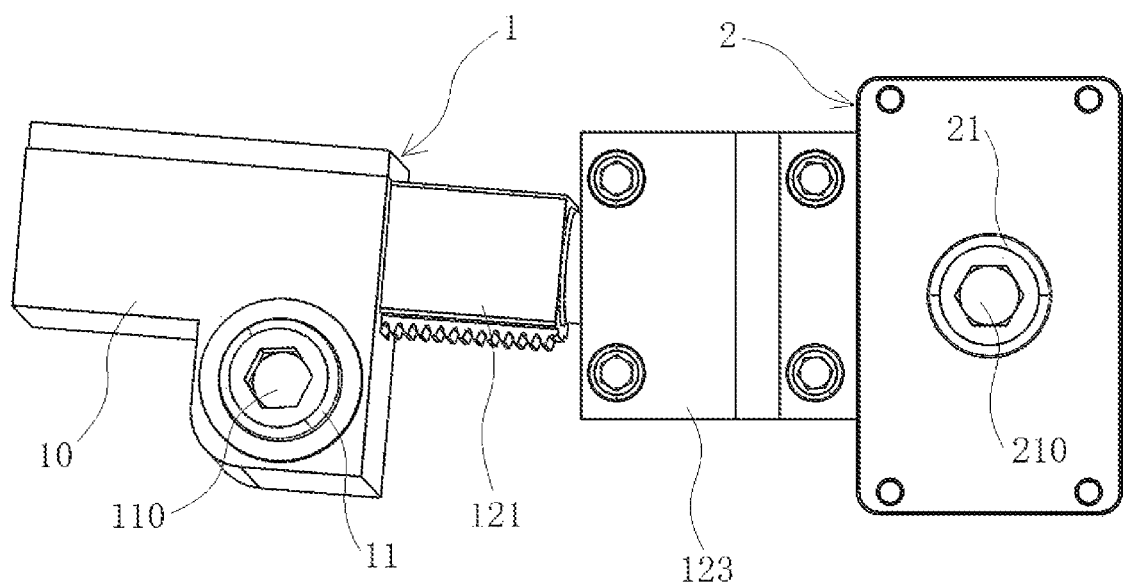
FIG. 2 is a schematic top view of the connection lock in FIG. 1.
Figure 3:
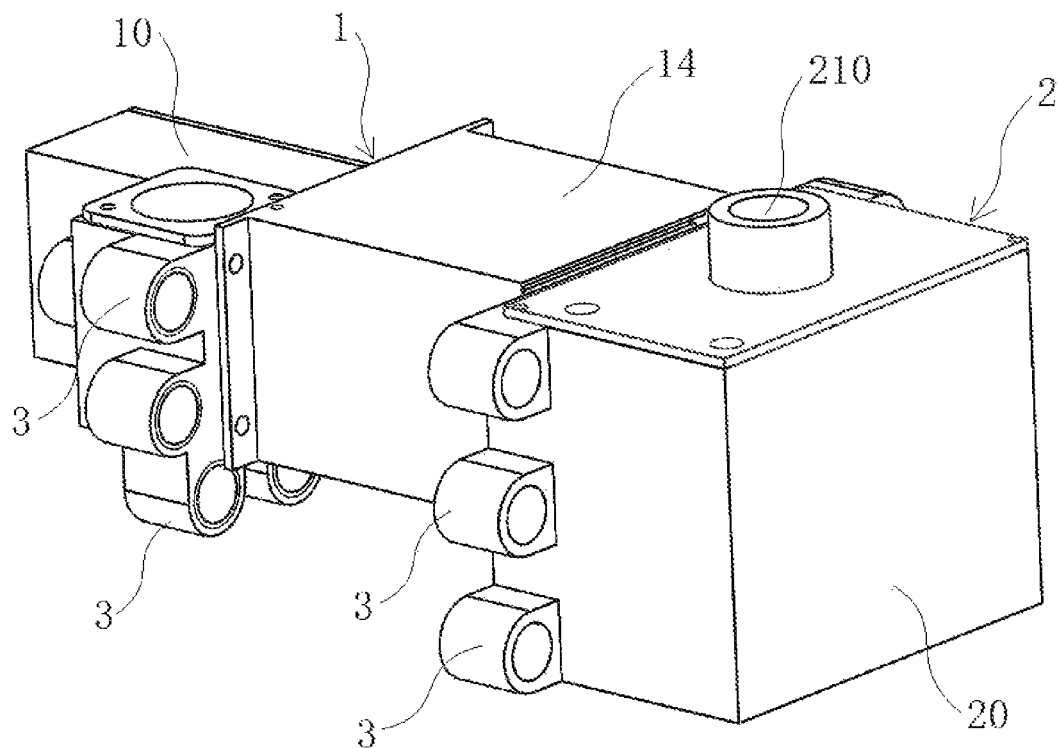
FIG. 3 is a schematic perspective view of the connection lock (a shell being sleeved on the lock pin structure) in the specific embodiment 1 of the connection lock for prefabricated components according to the present invention.
Figure 4:
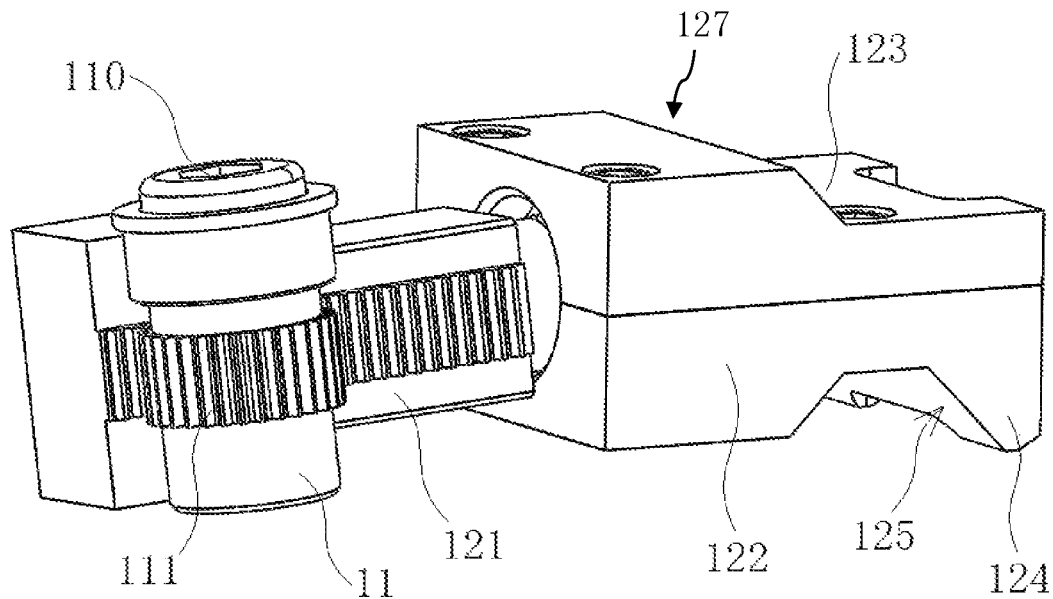
FIG. 4 is a schematic perspective view showing assembly of an auxiliary part transmission structure and a lock pin structure in FIG. 1.
Figure 5:
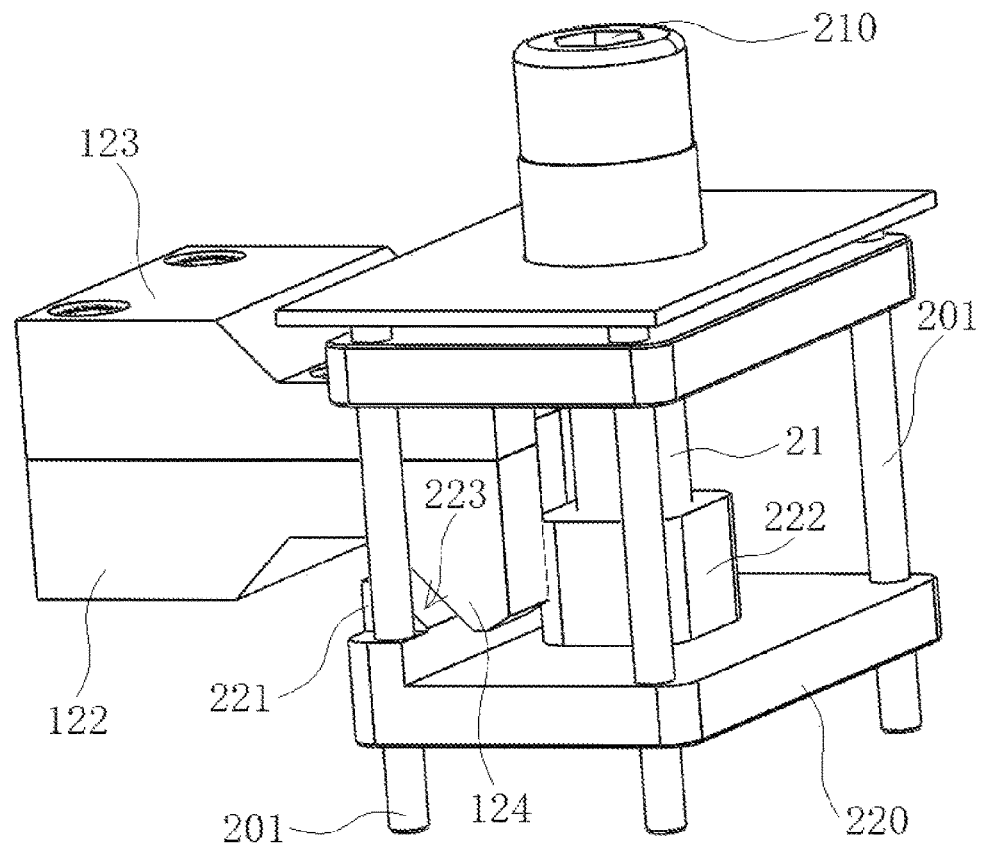
FIG. 5 is a schematic perspective view of the lock pin structure and a locking structure in FIG. 1 in a locked state.
Figure 6:
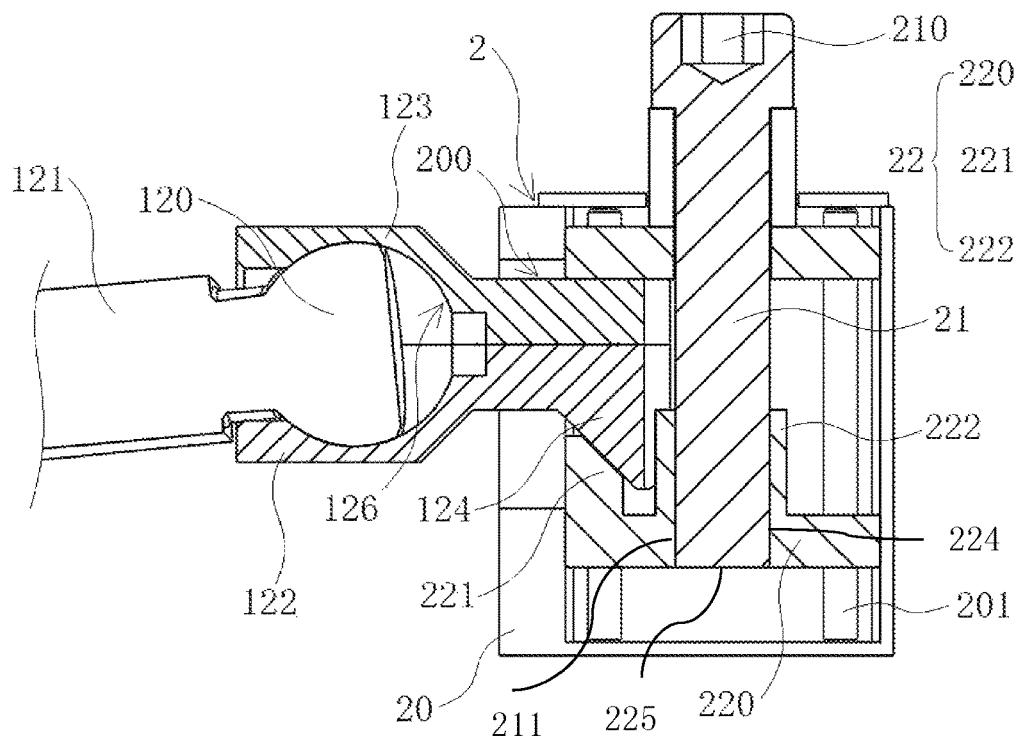
FIG. 6 is a schematic partial cross-sectional view of the connection lock in FIG. 1.

In a specific embodiment 1 of a connection lock for prefabricated components according to the present invention, as shown in FIG. 1 to FIG. 6, the connection lock for prefabricated components includes an auxiliary part 1 and a main part 2 which are each provided with a fixing structure for connecting with a prefabricated component in an anchoring fit manner. The auxiliary part 1 includes an auxiliary part body 10, an auxiliary part transmission structure, and a lock pin structure 12. The lock pin structure 12 is movably mounted to the auxiliary part body 10. The auxiliary part transmission structure is in transmission fit with the lock pin structure 12. The main part 2 includes a main part body 20, a main part transmission structure, and a locking structure 22. An inserting channel 200 fitted with the lock pin structure 12 is formed in the main part body 20. The locking structure 22 is adjustably mounted in the main part body 20. The main part transmission structure is in transmission fit with the locking structure 22. The locking structure 22 is in locked fit with the lock pin structure 12 after the lock pin structure 12 is inserted in place.

Before assembly is carried out, the auxiliary part 1 and the main part 2 are pre-arranged in the respective prefabricated components. The fixing structures of the auxiliary part 1 and the main part 2 are connected with the prefabricated components in an anchoring fit manner, and two prefabricated components respectively provided with the auxiliary part 1 and the main part 2 are butted and assembled. The auxiliary part transmission structure drives the lock pin structure 22 to move into the inserting channel 200 of the main part 2, and after the lock pin structure 22 is inserted in place, the main part transmission structure drives the locking structure 22 to move, so that the locking structure 22 and the lock pin structure 12 entering into the main part 2 are fitted in a locked manner, thereby achieving reliable connection between the auxiliary part 1 and the main part 2 and further between the two prefabricated components.

It should be noted that when the connection lock for prefabricated components is used for assembly, the lock pin structure 12 is telescopically adjusted by the auxiliary part transmission structure, and locking of the locking structure 22 and the lock pin structure 12 is achieved through the main part transmission structure. The two operations are respectively performed on the auxiliary part 1 (or its corresponding prefabricated component) and the main part 2 (or its corresponding prefabricated component), so that an assembly operation between two components is avoided, and an operation space does not need to be reserved at a butt position, which meets the assembly requirement for seamless connection of the prefabricated components. Moreover, the operation of connecting the prefabricated components is rapid and convenient, and the construction efficiency is relatively high.

In the present embodiment, the auxiliary part transmission structure is an auxiliary part transmission shaft 11 rotatably mounted to the auxiliary part body 10, a screw operation member, i.e., a screw operation member 110 of the auxiliary part transmission shaft, is arranged on an end of the auxiliary part transmission shaft 11, and an axial direction of the auxiliary part transmission shaft 11 is perpendicular to a movement direction of the lock pin structure 12. The auxiliary part transmission shaft 11 is provide with a gear 111 for stop or rotation of the auxiliary part transmission shaft 11. The lock pin structure 12 includes a rack section 121 engaged with the gear 111. Specifically, the screw operation member 110 of the auxiliary part transmission shaft is a hexagonal counterbore arranged on the end of the auxiliary part transmission shaft 11, and the auxiliary part transmission shaft 11 can be rotated by fitting a wrench into the hexagonal counterbore, thereby achieving telescopic adjustment of the rack section 121 and further the lock pin structure 12.

Moreover, the lock pin structure 12 further includes an insertion part 127 which is ball-hingedly connected to the rack section 121, and the insertion part 127 is arranged at an end of the rack section 121 away from the auxiliary part body 10. A ball head 120 is arranged on the end of the rack section 121 away from the auxiliary part body 10, one end of the insertion part 127 is provided with a ball groove 126 matched with the ball head 120, and the other end of the insertion part 127 is provided with chucks 124 matched with the locking structure 22. Specifically, the insertion part 127 includes a first block 122 and a second block 123 which are fixedly connected, one end of the first block 122 and one end of the second block 123 are each provided with an arc notch, and the arc notch of the first block 122 and the arc notch of the second block 123 together form the ball groove 126.

The lock pin structure 12 is designed as the rack section 121 and the insertion part 127 which are ball-hingedly connected. The chucks 124 of the insertion part 127 are matched with the locking structure 22 of the main part 2, and the rack section 121 and the insertion part 127 can achieve three-dimensional rotation adjustment, which can adapt to the butt error generated during assembly.

In the present embodiment, the main part transmission structure is a main part transmission shaft 21 rotatably mounted to the main part body 20, an end of the main part transmission shaft 21 is further provided with a screw operation member, i.e., a screw operation member 210 of the main part transmission shaft, and an axial direction of the main part transmission shaft 21 is perpendicular to a movement direction of the lock pin structure 12. The locking structure 22 is slidably mounted in the main part body 20, and the locking structure 22 is in screw-thread fit with the main part transmission shaft 21. Specifically, the screw operation member 210 of the main part transmission shaft is a hexagonal counterbore arranged on the end of the main part transmission shaft 21, and the main part transmission shaft 21 can be rotated by fitting a wrench into the hexagonal counterbore, so that the locking structure 22 has a locking effect on the chucks 124 of the insertion part 127 of the lock pin structure 12.

Moreover, guide rods 201 parallel to the axial direction of the main part transmission shaft 21 are arranged in the main part body 20, and the guide rods 201 slide through the locking structure 22. The main part transmission shaft 21 is provided with a threaded section 211, and the locking structure 22 is further provided with a threaded hole 224 matched with the threaded section 211. Specifically, the locking structure 22 includes a plate-shaped sliding seat 220, stopping protrusions 221, and a nut 222. The plate-shaped sliding seat 220 is in sliding fit with the guide rods 201. The stopping protrusions 221 are arranged on an edge of the plate-shaped sliding seat 220. A through hole 225 is formed in a middle of the plate-shaped sliding seat 220. The nut 222 is fixed to the through hole 225 of the plate-shaped sliding seat 220. Through screw-thread fit between the threaded section 211 of the main part transmission shaft 21 and the nut 222, the plate-shaped sliding seat 220 is in sliding fit with the guide rods 201, so that the locking structure 22 can move up and down in the axial direction of the main part transmission shaft 21, thereby achieving a locking effect of the locking structure 22 on the lock pin structure 12.

A first locking inclined surface 125 is formed in an inner side of each chuck 124. A second locking inclined surface 223 is formed in an inner side of each stopping protrusion 221. The first locking inclined surface 125 is in sliding fit with the second locking inclined surface 223. When the locking structure 22 is adjusted upward in the axial direction of the main part transmission shaft 21, as the second locking inclined surfaces 223 of the stopping protrusions 221 move up, they slide along the first locking inclined surfaces 125 of the chucks 124, so that the chucks 124 and the insertion part 127 are driven to move toward the main part 2, thereby enhancing the locking effect between two prefabricated components. In addition, a shell 14 is sleeved on the lock pin structure 12 to protect the lock pin structure 12. In other embodiments, in order to meet different use requirements, the shell 14 on the lock pin structure may be omitted.

The fixing structure includes a plurality of threaded sleeves 3 for connecting with steel bars of the prefabricated components, and axes of the plurality of threaded sleeves 3 are parallel to a movement direction of the lock pin structure 12, so that the bonding strength and integrity between the auxiliary part 1 and the corresponding prefabricated component thereof and between the main part 2 and the corresponding prefabricated component thereof are ensured. In other embodiments, in order to meet different use requirements, the threaded sleeves 3 can be replaced with anchoring ribs or protrusions fixed to the auxiliary part body and the main part body. By welding the anchoring ribs or protrusions with the steel bars of the prefabricated components, the bonding strength and integrity between the auxiliary part and the corresponding prefabricated component thereof and between the main part and the corresponding prefabricated component thereof can also be ensured.

The foregoing descriptions are only preferred implementations of the present invention. It should be noted that several improvements and replacements may further be made by a person of ordinary skill in the art without departing from the principle of the present invention, and such improvements and replacements should also be deemed as falling within the protection scope of the present invention.

The invention claimed is:

1. A connection lock for prefabricated components, comprising an auxiliary part and a main part, wherein the auxiliary part and the main part are each provided with a fixing structure for connecting with prefabricated components in an anchoring fit mode, the auxiliary part comprises an auxiliary part body, an auxiliary part transmission structure, and a lock pin structure, the lock pin structure is movably mounted to the auxiliary part body, and the auxiliary part transmission structure is in transmission fit with the lock pin structure; and the main part comprises a main part body, a main part transmission structure, and a locking structure, an inserting channel fitted with the lock pin structure is formed in the main part body, the locking structure is adjustably mounted in the main part body, the main part transmission structure is in transmission fit with the locking structure, and the locking structure is lockingly fitted with the lock pin structure after the lock pin structure is inserted in the inserting channel, the auxiliary part transmission structure is an auxiliary part transmission shaft rotatably mounted in the auxiliary part body, an end of the auxiliary part transmission shaft is provided with a screw operation member, an axial direction of the auxiliary part transmission shaft is perpendicular to a movement direction of the lock pin structure, the auxiliary part transmission shaft is provided with a gear for stop or rotation of the auxiliary part transmission shaft, and the lock pin structure comprises a rack section engaged with the gear.

2. The connection lock for prefabricated components according to claim 1, wherein the lock pin structure further comprises an insertion part ball-hingedly connected to the rack section, and the insertion part is arranged at an end of the rack section away from the auxiliary part body.

3. The connection lock for prefabricated components according to claim 2, wherein a ball head is arranged on the end of the rack section away from the auxiliary part body, one end of the insertion part is provided with a ball groove matched with the ball head, and the other end of the insertion part is provided with chucks matched with the locking structure.

4. The connection lock for prefabricated components according to claim 3, wherein the insertion part comprises a first block and a second block which are fixedly connected, one end of the first block and one end of the second block are each provided with an arc notch, and the arc notch of the first block and the arc notch of the second block together form the ball groove.

5. The connection lock for prefabricated components according to claim 1, wherein the main part transmission structure is a main part transmission shaft rotatably mounted in the main part body, a screw operation member is also arranged on an end of the main part transmission shaft, an axial direction of the main part transmission shaft is perpendicular to a movement direction of the lock pin structure, the locking structure is slidably mounted in the main part body, and the locking structure is in screw-thread fit with the main part transmission shaft.

6. The connection lock for prefabricated components according to claim 5, wherein guide rods parallel to an axial direction of the main part transmission shaft are arranged in the main part body, the guide rods slide through the locking structure, the main part transmission shaft is provided with a threaded section, and the locking structure is further provided with a threaded hole matched with the threaded section.

7. The connection lock for prefabricated components according to claim 6, wherein the locking structure comprises a plate-shaped sliding seat, stopping protrusions, and a nut, the plate-shaped sliding seat is in sliding fit with the guide rods, the stopping protrusions are arranged on an edge of the plate-shaped sliding seat, a through hole is formed in a middle of the plate-shaped sliding seat, and the nut is fixed to the through hole of the plate-shaped sliding seat.

8. The connection lock for prefabricated components according to claim 7, wherein chucks are arranged on an end of the lock pin structure away from the auxiliary part body, a first locking inclined surface is formed on an inner side of each chuck, a second locking inclined surface is formed on an inner side of each stopping protrusion, and the first locking inclined surface is in sliding fit with the second locking inclined surface.

9. The connection lock for prefabricated components according to claim 1, wherein each fixing structure comprises a plurality of threaded sleeves for connecting with steel bars of the prefabricated components, and axes of the plurality of threaded sleeves are parallel to a movement direction of the lock pin structure.

* * * * *